United States Patent [19]

Kemner et al.

[11] Patent Number: 5,178,403
[45] Date of Patent: Jan. 12, 1993

[54] ELECTRICAL ENERGY GENERATING DEVICE FOR A WHEELED SEMI-TRAILER

[75] Inventors: Axel Kemner, Isernhagen; Mahmud Keschwar, Barsinghausen; Hans-Firederich Meyer, Gehrden; Karl-Heinz Schweer, Gehrden, all of Fed. Rep. of Germany

[73] Assignee: Mannesmann Aktiengesellschaft, Düsseldorf, Fed. Rep. of Germany

[21] Appl. No.: 676,161

[22] Filed: Mar. 25, 1991

[30] Foreign Application Priority Data

Mar. 24, 1990 [DE] Fed. Rep. of Germany ....... 4009504

[51] Int. Cl.5 ............................................. B62D 53/06
[52] U.S. Cl. .................................. 280/423.1; 180/165; 180/65.3; 322/1
[58] Field of Search ...................... 180/165, 53.1, 53.8, 180/65.3, 14.2, 14.1; 280/420, 421, 422, 423.1, 151; 318/1, 139; 322/1, 40

[56] References Cited

U.S. PATENT DOCUMENTS

| 1,766,163 | 6/1930 | Vukosav | 180/14.1 |
| 2,159,885 | 5/1939 | Cullin | 322/1 |
| 3,880,250 | 4/1975 | Emanuele | 180/65.3 |
| 3,884,502 | 5/1975 | Wagner | 280/423.1 |
| 4,032,829 | 6/1977 | Schenauar | 180/652 X |
| 4,285,279 | 8/1981 | Chippetti | 105/118 |
| 4,353,565 | 10/1982 | Smith et al. | 280/149.2 |

FOREIGN PATENT DOCUMENTS

3141722 5/1983 Fed. Rep. of Germany ...... 180/165

Primary Examiner—Margaret A. Focarino
Assistant Examiner—Kevin Hurley
Attorney, Agent, or Firm—Thomas N. Ljungman

[57] ABSTRACT

A land vehicle in the form of a wheeled semi-trailer and thereon (e.g., a braking device) is provided with an on-board energy having a consumer of energy providing device which is driven, through a controlling apparatus by a compressed air supply or by a flexible drive shaft arrangement connected to a wheel of the semi-trailer.

20 Claims, 5 Drawing Sheets

ELECTRICAL ENERGY GENERATING DEVICE FOR A WHEELED SEMI-TRAILER

BACKGROUND OF THE INVENTION

1. Field of the Invention

The present invention relates to an apparatus for the supply of energy to an energy consuming device which is preferably located on a tractor drawn trailer vehicle.

2. Background Information

On a trailer vehicle pulled by a tractor vehicle, which is in turn powered by a motor or engine, the trailer may have an energy consumer, such as an anti-lock control system for the brakes, in which case it is customary to feed the energy consumer of the trailer vehicle with energy from an energy source provided either in or on the tractor vehicle.

Such an arrangement requires a relatively powerful energy source on the tractor vehicle. Moreover, the energy consumer on the trailer vehicle can only be operated if the trailer vehicle is coupled to the tractor vehicle.

A particularly disadvantageous aspect of such an arrangement is the dependence of the energy consumer on the energy source located on the tractor vehicle, particularly in the case where the trailer vehicles in question are part of a railroad train, since, on one hand, the energy source on the tractor vehicle (locomotive) must be very powerful, and on the other hand, when defects occur in the energy connections between the individual trailer vehicles, the energy consumers located on the trailer vehicles in question become inoperable.

Of course, it is conceivable that each individual trailer vehicle might be equipped with an energy storage device, which would supply the energy consumer or consumers of the trailer vehicle with energy.

However, such a solution has the disadvantage that the energy storage device losed its energy when the trailer vehicle is standing still for long periods of time, and when the trailer vehicle is put back into operation, the energy required for the energy consumer or consumers located on the trailer vehicle is not available.

OBJECT OF THE INVENTION

One object of the present invention is therefore the provision of an apparatus for the supply of an electrical consumer located on a trailer vehicle with electrical energy. An apparatus constructed according to the invention guarantees that electrical energy is constantly available for the electrical consumer located on the trailer vehicle.

SUMMARY OF THE INVENTION

This and other objects of the present invention are achieved by means of the invention disclosed herein. Various refinements and advantageous configurations of the invention are also disclosed.

The present invention offers a particular advantage in that each trailer vehicle is made independent of an external electrical energy supply and independent of charging stations.

In one embodiment of the invention, a generator which produces the electrical energy can advantageously be driven with compressed air taken from a compressed air reservoir already present on the trailer vehicle (e.g., a reservoir which is used to supply compressed air to the braking equipment on the trailer vehicle).

The volume of compressed air required for this purpose is not very large, since the generator need only be powered until a storage battery, preferably provided on the trailer vehicle and connected to the generator by means of a control circuit, has reached a predetermined charge.

Since the generator, the storage battery and the electrical consumer are electrically connected to one another by means of the control circuit, when the storage battery is initially discharged or exhibits a low charge, the electrical consumer is supplied with electrical energy directly by the generator, and the storage battery may be simultaneously charged with any excess electrical energy from the generator.

The generator can also be advantageously powered by means of a flexible shaft (e.g., a flexible drive shaft) which is connected, on the one hand, to the drive (or power input) shaft of the generator and, on the other hand, to an axle torsionally connected to one wheel of the trailer vehicle, or, alternatively, in a mechanical linkage with a vehicle wheel or a member located on the axle or on the vehicle wheel.

The generator, the storage battery and the electrical control circuit may be advantageously grouped together in a single housing.

These parts can be located together or separately at any desired location or locations on the trailer vehicle, since the flexible shaft required to drive the generator or the pneumatic line carrying the compressed air flowing past a part connected to the generator can, on the one hand, be as long as necessary and, on the other hand, can be made to bypass any obstacle. The flexible shaft is preferably guided in a flexible sleeve.

Such flexible power transmitting drive shafts are well known to those of ordinary skill in the mechanical arts and are disclosed, for example, in U.S. Pat. No. 4,242,855 entitled "Lawn Mower Auxiliary Unit with Flexible Drive Shaft" and issued on Jan. 6, 1981; U.S. Pat. No. 3,885,885 entitled "Fluid Propelling Apparatus Employing Flexible Drive Shaft" and issued on May 27, 1975; U.S. Pat. No. 4,318,280 entitled "Dual Property Shaft" and issued on Mar. 9, 1982; and U.S. Pat. No. 4,184,576 entitled "Power Driven Flexible Shaft Clutch Assembly" and issued on Jan. 22, 1980.

In an embodiment having a generator powered by means of compressed air, there is advantageously and preferably provided a relay valve for shutting off the generator, preferably an electromagnetically operated relay valve, which can be activated by means of the signals generated by the control circuit.

The relay valve is preferably located in the vicinity of a terminal end of an air line carrying the compressed air flow of the powered part connected to the drive shaft of the generator. Naturally, it can also be located at any other point of this line, e.g., at the connection point of this additional line serving as a pneumatic flow line with another pneumatic line, or, if the pneumatic line is connected directly to the compressed air reservoir, at this connection point. The relay valve can advantageously also be located within the same housing which contains the generator, the storage battery and the control circuit. In such case, the pneumatic line will be conducted over at least a portion of its length through this housing or into this housing.

In an embodiment wherein the generator is driven by means of a flexible shaft, the shaft can preferably be connected to the generator, to the wheel or to the axle by means of a relay coupling. In such case, the relay coupling can be activated by signals from the electrical control circuit.

BRIEF DESCRIPTION OF THE DRAWINGS

Various preferred embodiments of the invention are explained in greater detail below and are illustrated in the accompanying drawings, wherein.

DESCRIPTION OF THE PREFERRED EMBODIMENTS

Figure 1:
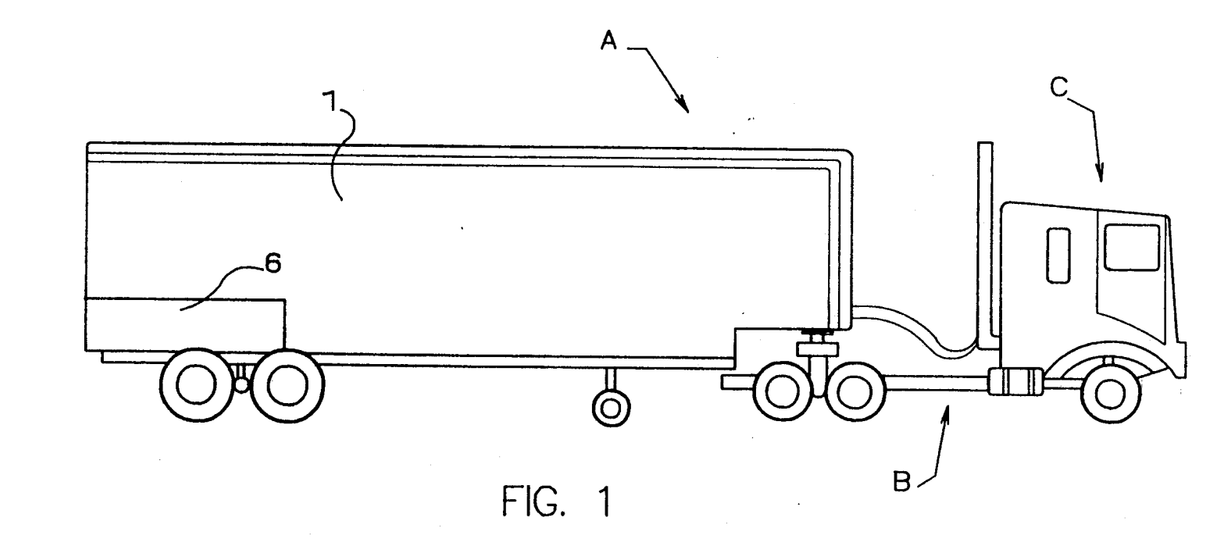
FIG. 1 is an elevational view of a tractor drawn wheeled semi-trailer vehicle embodying the invention.

Referring first to FIG. 1, a trailer vehicle A is provided with a hitch (or "fifth wheel") B, whereby the trailer vehicle A may be engaged to a tractor vehicle C for tractional movement thereby.

Figure 2:
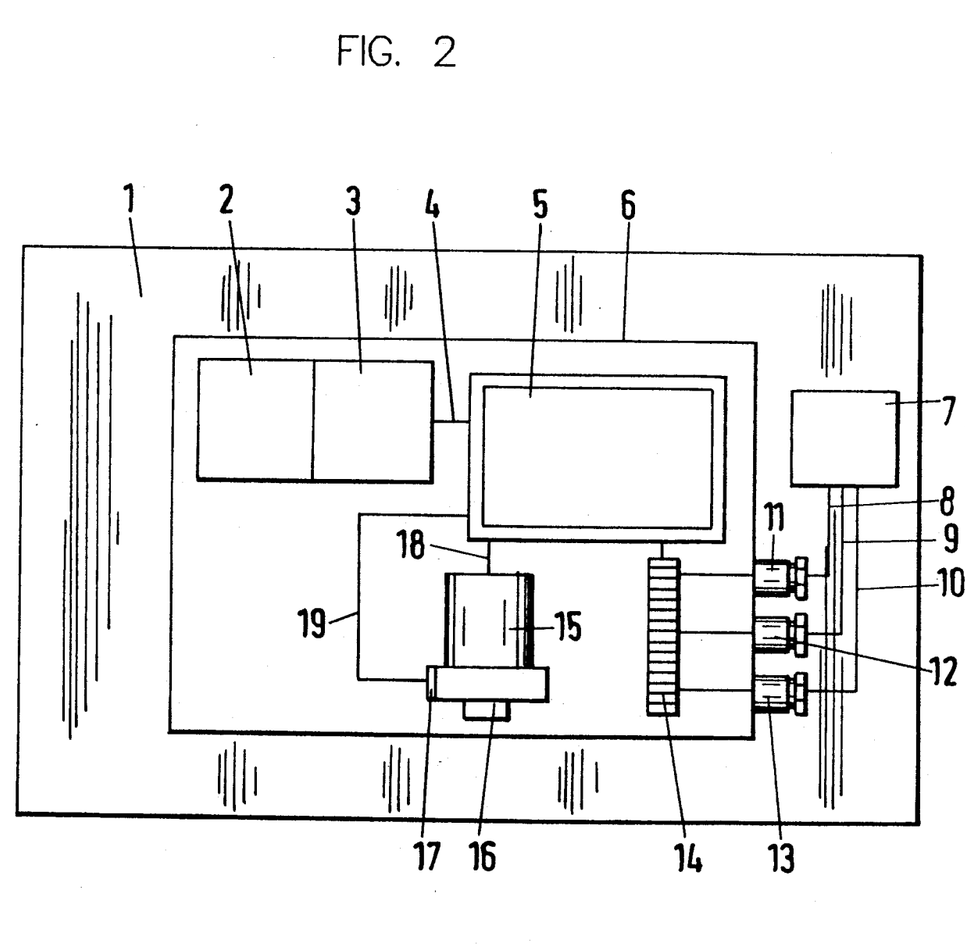
FIG. 2 is a schematic illustration of a first preferred embodiment of an apparatus according to the invention for the supply of electrical energy to an electrical consumer on a trailer vehicle.

Referring next to FIG. 2, a portion 1 of the trailer vehicle A, to which a housing 6 is fastened, contains an apparatus according to the invention for the supply of electrical energy to an electrical consumer located on the trailer vehicle A.

The housing 6 contains a generator 15, an electrical control circuit 5 and preferably two storage batteries 2 and 3, as well as a connecting block 14 connected to the electrical control circuit 5 [Of course, only one storage battery 2 or 3 could alternately be employed.].

The generator 15 is provided with a drive apparatus 16 to drive the generator 15. The following descriptions are mainly directed to additional details relating to the powering and control of the drive apparatus 16 which drives the generator 15.

An output from the generator 15 is connected to the electrical control circuit 5 via an electrical line 18. Likewise, the two storage batteries 2 and/or 3 are connected to the electrical control circuit 5 by means of a an electrical line 4. The electrical control circuit 5 is also connected, by means of another electrical line 19, to a switching apparatus 17 associated with the generator 15, by means of which the drive apparatus 16 can be switched for the generator 15, so that the drive apparatus 16 for the generator 15 can be connected or disconnected therefrom.

The connecting block 14 is connected, on the one hand, to the electrical control circuit 5 and, on the other hand, via provided connections 11, 12 and 13 (and lines 8, 9 and 10 connected thereto), to an electrical consumer 7, such as an anti-lock brake control for the braking system of the trailer vehicle. If the generator 15 is driven by the drive apparatus 16, then electrical energy (e.g., current) travels via the electrical line 18 to the electrical control circuit 5. A circuit portion within the electrical control circuit 5 first checks the charging status of the storage battery or batteries 2 and/or 3. If the storage battery or batteries 2 and/or 3 have a specified sufficient charge, then another circuit portion of the electrical control circuit 5 sends a switching signal to the switching apparatus 17 on the generator 15 via the electrical line 19. The switching apparatus 17 is thereby caused to interrupt the interconnection between the drive apparatus 16 and the generator 15. By means of the connecting block 14 and the electrical lines 8, 9 and 10, the electrical consumer 7 is supplied with electrical energy (e.g., current) from the storage battery or batteries 2 and/or 3.

If the control circuit 5 determines that the charge in the storage battery or batteries 2 and/or 3 has dropped below a specified minimum charge (or that the batteries 2 and/or 3 are completely empty), the electrical consumer 7 is supplied directly by means of the electrical control circuit 5 with the electrical energy (e.g., current) supplied by the generator 15. Excess electrical energy from the generator 15 not used by the electrical consumer 7 is sent via the control circuit 5 to the storage battery or batteries 2 and/or 3, so that they are recharged thereby.

Figure 3:
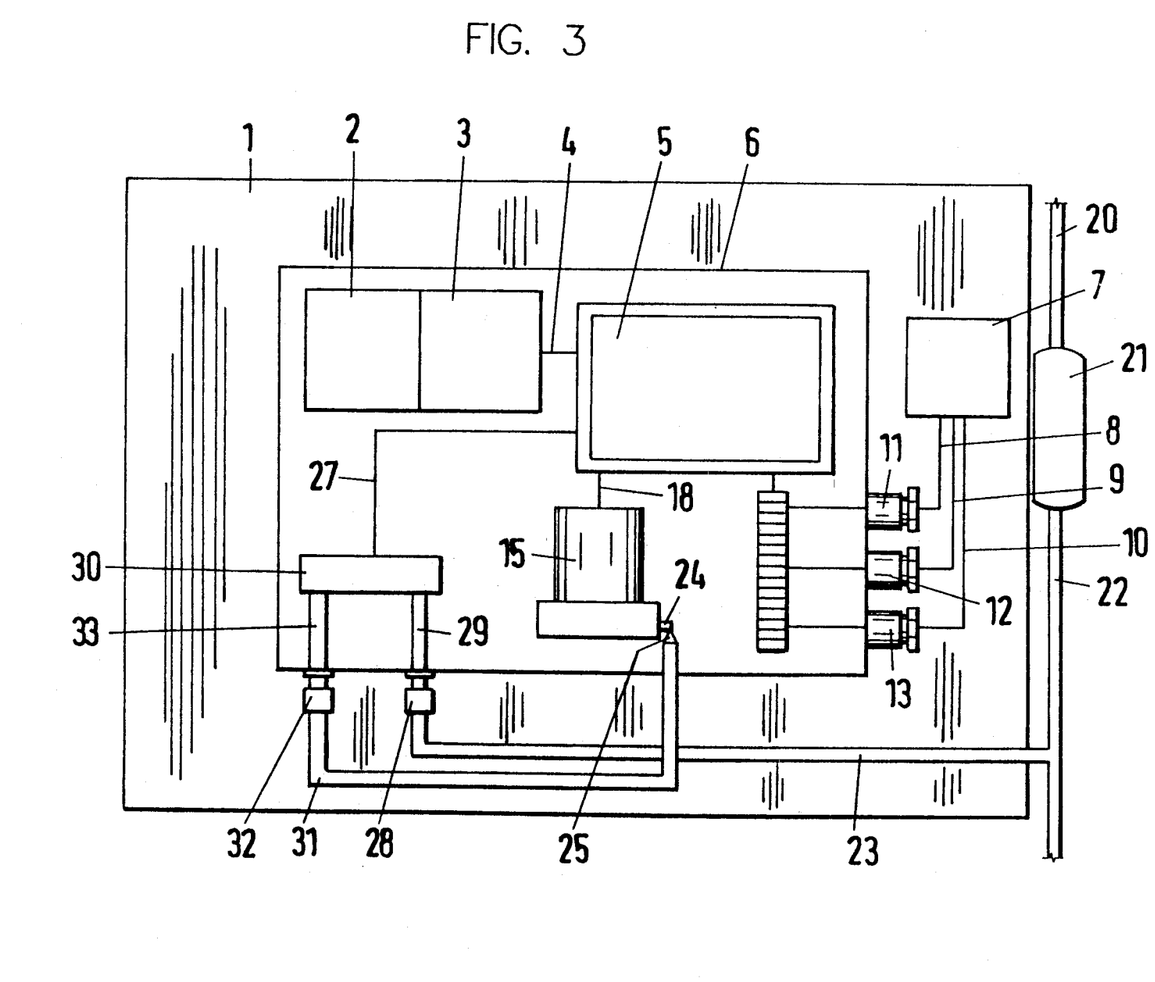
FIG. 3 is another schematic illustration of the apparatus shown in FIG. 2, wherein the generator is powered by means of compressed air.

FIG. 3 illustrates another more detailed embodiment of an apparatus according to the invention for the supply of electricity to an electrical consumer located on a trailer vehicle. For the sake of clarity, those items which are preferably substantially identical to items illustrated in FIGS. 1 and 2 have been identified by identical reference numbers.

Fastened to a portion 1 of a trailer vehicle A (e.g., a railroad freight car), there is provided a housing 6 which contains a generator 15, an electrical control circuit 5, preferably two storage batteries 2 and 3, portions 29 and 33 of a pneumatic line 23 and 31 (which serves as a pneumatic flow line), a relay valve 30 (preferably designed as an electromagnetic valve), which is located in the portions 29 and 33 of the pneumatic line 23, 31, 29 and 33, and a connecting block 14 connected to the electrical control circuit 5.

An output from the generator 15 is connected, by means of an electrical line 18, to an input of the electrical control circuit 5. The storage batteries 2 and/or 3 are also connected, via an electrical line 4, to an additional input of the electrical control circuit 5.

A first output of the electrical control circuit 5 is connected, through the connecting block 14 and by means of provided electrical lines 8, 9 and 10, to, for example, an anti-lock control system for the brakes of the vehicle (e.g., brake cylinders, valves, pneumatic lines, etc.) which represents the electrical consumer in the illustrated application. An additional output of the electrical control circuit 5 is connected, by means of an electrical line 27, to an electrical input of a relay valve 30, preferably provided in the form of an electromagnetic valve. The relay valve 30 is located in the portions 29 and 33 of the additional pressure medium line 23, 29, 33 and 31 located in the housing 6, which serves as the pneumatic flow line.

As shown, the relay valve 30 is located at a point on the additional pneumatic line 23, 29, 33 and 31 which makes it possible to block off at least the region containing the terminal end (e.g., the terminal end terminating in a nozzle 25) of the additional pneumatic line 23, 29, 33 and 31 from the pneumatic reservoir 21, or from another pneumatic line 22, which supplies compressed air to the additional pneumatic line 23, 29, 33 and 31.

The additional pneumatic line 23, 29, 33 and 31, which serves as the pneumatic flow line, is split into two portions. The portion 29 of the pneumatic line connected to the input of the relay valve 30 is bolted to one wall of the housing 6, and is connected via a connection coupler 28 to a portion 23 of the pneumatic flow line, which can be connected, for example, to a pneumatic line 22 of a pneumatic braking system of the trailer vehicle A. The other portion 33 of the pneumatic flow line 23, 29, 33 and 31, which is connected to the output of the relay valve 30, is also bolted to the wall of the housing 6, and is connected, via a connection coupler 32, to a portion 31 of the pneumatic flow line. The terminal end of this portion 31 of the pneumatic flow line 23, 29, 33 and 31 is provided with a nozzle 25, which extends into the housing 6, and which is directed toward a drive apparatus 24 that is connected to a drive shaft of the generator 15. The drive apparatus 24 is preferably configured as a radial turbine. Of course, it could also be configured as an axial turbine.

Drive apparatuses utilizing axial or radial turbines are well known to those of ordinary skill in the mechanical arts. For example, reference is made to U.S. Pat. No. 4,821,506 entitled "Radial Turbine with Variable Axial Nozzle" and issued on Apr. 18, 1989; U.S. Pat. No. 4,781,528 entitled "Variable Capacity Radial Flow Turbine" and issued on Nov. 1, 1988; and U.S. Pat. No. 4,629,396 entitled "Adjustable Stator Mechanism for High Pressure Radial Turbines and the Like" and issued on Dec. 16, 1986.

The portions 31 and 32 of the pneumatic flow line 23, 29, 33 and 31 which are connected to the couplers 32 and 28 are preferably located outside of the housing 6, except for the terminal region thereof, which is provided with the nozzle 35.

The portion 22 of the pneumatic line used as the brake line is connected to the output of a pneumatic reservoir 21. An additional pneumatic line 20 is connected to the input of the pneumatic reservoir 21 and is fed with compressed air generated by a compressor, located, for example, in a tractor (C in FIG. 1) or locomotive component of a tractor trailer vehicle.

The relay valve 30 could, of course, also be located outside the housing 6, if so desired. In such case, the additional pneumatic line serving as the pneumatic flow line need no longer be split into two portions and connected to the housing 6 by means of couplers.

Figure 4:
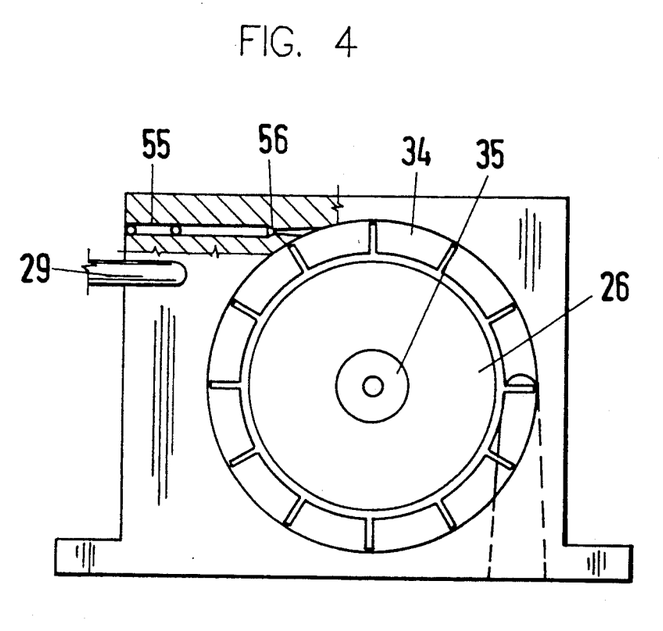
FIG. 4 is an elevational view of a pneumatic drive for the generator.
Figure 5:
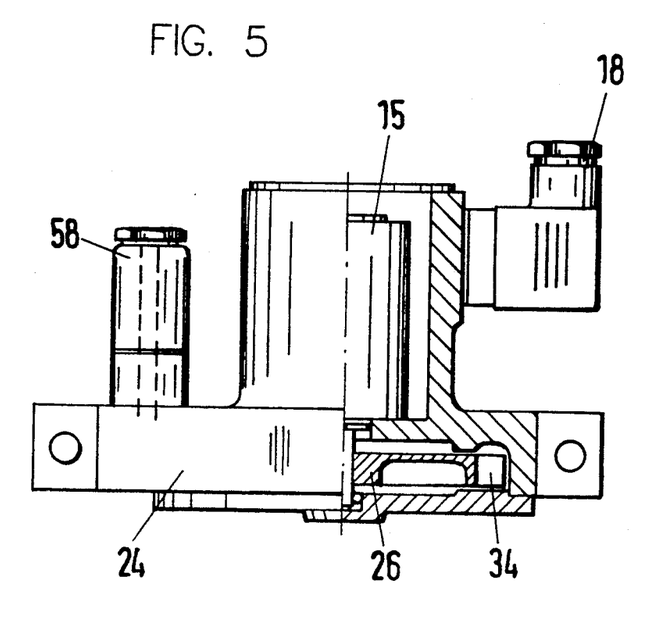
FIG. 5 is an elevational view showing the generator and a corresponding pneumatic drive located in a single housing.

A preferred embodiment of a drive apparatus 16 and a generator 15 is illustrated in greater detail in FIGS. 4 and 5.

For the sake of clarity, those items in FIGS. 4 and 5 which are preferably substantially identical to items shown in FIGS. 2 and 3 are identified by identical reference numbers.

The generator 15 is preferably located in a housing, and is provided with a drive shaft 35, to which a disc-shaped circular body 26 is connected such that the drive shaft 35 and the disc-like circular body 26 rotate together as a unit. The disc-shaped circular body 26 is provided with blades 34 which extend outward therefrom, either perpendicularly, or at least at a transverse angle to the longitudinal axis of the drive shaft 35. Within the housing, and oriented transverse to the longitudinal axis of the drive shaft 35 of the generator, there is formed or otherwise provided a passage 55, which is preferably provided with a nozzle 56 on its free end, the nozzle 56 being oriented so as to face the blades 34 provided on the disc-shaped circular body 26. The passage 55 can be connected, for example, to the portion 31 of the pneumatic flow line shown in FIG. 4.

FIG. 5 again shows the generator 15 located in the above mentioned housing. The disc-shaped circular body 26 is located on the drive shaft 35 of the generator 15, so that it rotates together with the blades 34. Located on the generator 15, or, in terms of function, on a part of the generator 15, there is provided a magnetic valve 58, which corresponds, in terms of function, to the valve 30 illustrated in FIG. 3. The portion 29 of the pneumatic flow line is connected to the input of the magnetic valve 58. On the housing containing the generator 15, there is also provided an electrical coupling for the electrical line 18, which connects the generator 15 to the electrical control circuit 5.

The operation of the apparatus illustrated in FIG. 3 is explained in greater detail below.

When the apparatus shown in FIG. 3 and described above is connected to the compressed air system (e.g., when the compressor which may be located on the tractor vehicle is turned on, or when a valve located in the compressed air line of the trailer vehicle is opened), the generator 15 immediately starts up, (i.e., the drive apparatus 24 connected to the drive shaft of the generator 15 is driven by the compressed air from the pneumatic flow line 23, 29, 33 and 31, and the drive shaft 35 of the generator 15 is thus made to rotate). The generator 15 thereby supplies the electrical control circuit 5 with electrical energy (e.g., current). The electrical control circuit 5 first checks the charge status of the storage battery or batteries 2 and/or 3. If the storage batteries 2 and/or 3 are sufficiently charged (i.e., if the storage batteries 2 and/or 3 have reached the specified charge status necessary for supplying the electrical consumer), the electrical control circuit 5 sends a signal to the relay valve 30 via the line 27, and the relay valve 30 is, in response thereto, closed.

The compressed air feed of the portion 31 of the pneumatic flow line 23, 29, 33 and 31 with the nozzle 25 is interrupted, so that the generator 15 is not driven. The electrical consumer 7 is supplied via the electrical control circuit 5 with energy (e.g., current) directly from the storage batteries 2 and/or 3.

Whenever the charge in the storage batteries 2 and/or 3 drops below the specified level, the electrical control circuit 5 sends a signal, via the line 27, to the relay valve 30, thereby causing the relay valve 30 to open. Compressed air then flows through the pneumatic line 23, 29, 33 and 31 to the drive apparatus 24 of the generator 15. The generator 15 is thereby driven and, by means of the electrical control circuit 5, on one hand, recharges the storage batteries 2 and/or 3 and, on the other hand, feeds the electrical consumer 7 with electrical energy (e.g., current) via the electrical control circuit 5, the connecting block 14 and the lines 8, 9 and 10.

If, during start up, the storage battery or batteries 2 and/or 3 are completely discharged, the electrical energy (e.g., current) produced by the generator 15 is preferably designed to be sufficient to, on the one hand, supply the electrical consumer 7 with electrical energy (e.g., current) and on the other hand, to charge the storage batteries 2 and/or 3.

The apparatus described above requires no external electrical energy feed, and additionally, is ready for operation as soon as it is connected to a compressed air supply. Moreover, a constant supply of the electrical consumer 7 with electrical energy is guaranteed, even when the vehicle is stopped, or at different speeds of travel.

Figure 6:
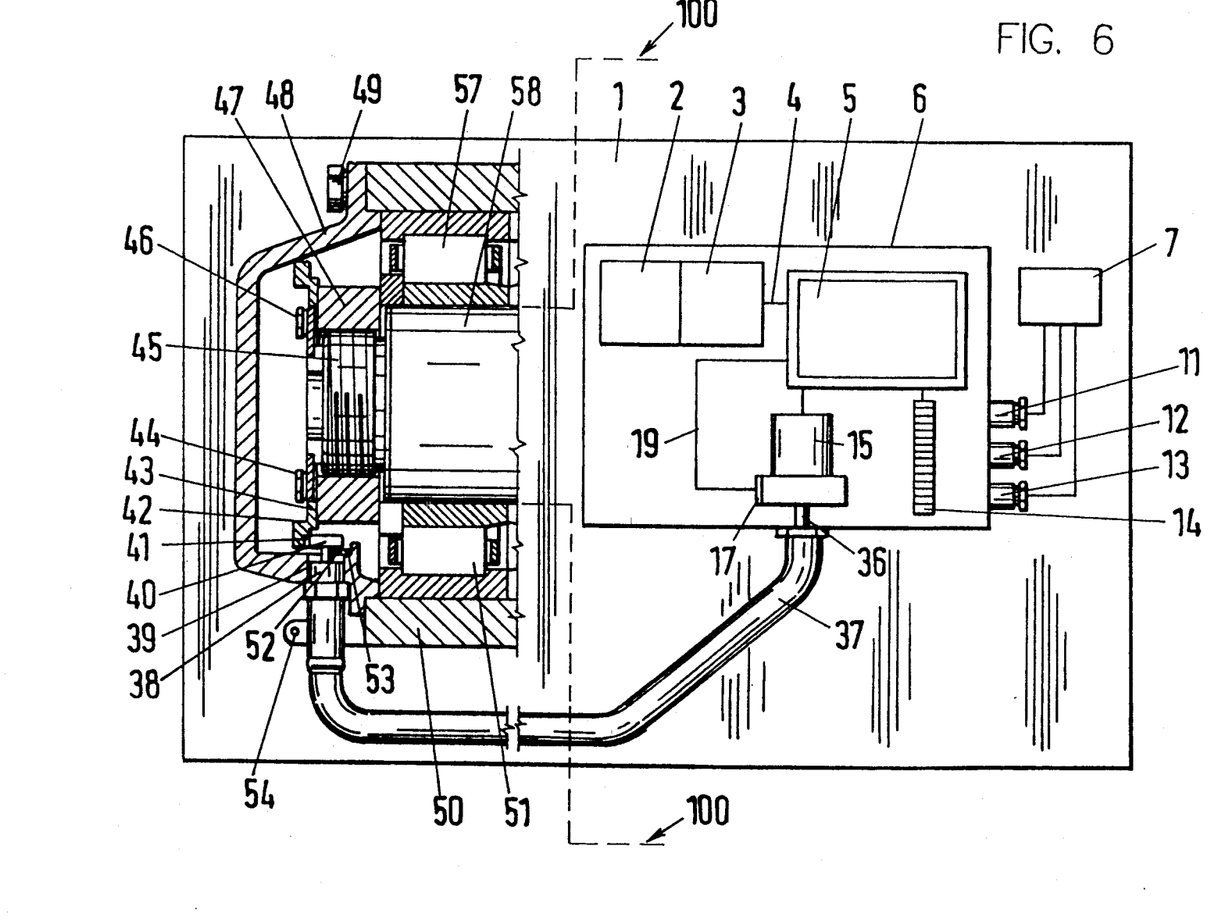
FIG. 6 is a schematic view of an alternative embodiment of the invention, wherein the generator is connected by means of a flexible shaft to a member or device located on the axle of the vehicle.

FIG. 6 illustrates an apparatus similar to the apparatus shown in FIG. 2, with the distinction that the generator 15 is driven by means of a flexible (e.g., elastic) shaft under power supplied by a driving member located on the vehicle axle.

For the sake of simplicity, the following description relates mainly to the drive of the generator 15.

Moreover, for the sake of clarity, those items shown in FIG. 6 which are preferably substantially the same as items illustrated in FIGS. 2 and 3 have been identified by identical reference numbers.

FIG. 6 shows an axle 58 (preferably of the trailer vehicle 1) mounted so that it can rotate in a housing open on its two opposite sides, with the interposition of bearings 51 and 57. The axle 58 is provided, on each of its end surfaces facing away from one another, with a graduated extension 45 with threads. [Only one of the two extensions 45 is shown in FIG. 5. A wheel 100 of the trailer vehicle A is also indicated schematically in FIG. 6.] On each of these extensions 45, a nut 47 is threadingly attached, which secures the axle 58 and the bearings 51 and 57 in the axial direction. On the free end surface of one of these nuts 47, there is provided a ring-shaped body 42 and 43 bent at a right angle and fastened by means of screws 44 and 46. The free end of the axle 58 with the nut 47 and the ring-shaped body 42 and 43 is covered by a pot-shaped cover 48, which is fastened to the housing 50 by means of screws 49.

The cover 48 has an opening 39, which extends in the radial direction of the axle toward the nut 47. A graduated portion 38 of a flexible (e.g., elastic) sleeve 37 of a flexible shaft 36 is mounted in the opening 39 of the cover 48. The terminal portion of the sleeve 37 of the flexible shaft 36, located in the vicinity of the cover 48, is fixed to the housing 50 by means of a clamping device 54. The flexible shaft 36 has, on its terminal region inside the cover, a frictional wheel 40, which is in mechanical linkage with the right-angled portion 42 of the ring-shaped body 42 and 43. The other end of the flexible sleeve 37 containing the flexible shaft 36 is fastened to a wall of the housing 6 containing the storage batteries 2 and/or 3, the electrical control circuit 5 and the generator 15. The end of the flexible shaft 36 facing the generator 15 is connected to the drive shaft of the generator, either directly or by means of a relay coupling.

If a relay coupling is provided on the generator 15 between the drive shaft of the generator and the flexible shaft 36, this relay coupling is preferably designed so that it can be switched by electrical signals from the electrical control circuit 5, whereby the generator 15 can be started or stopped.

The flexible shaft 36 is preferably prestressed by a suspension element 52, which is braced, on the one hand, on a portion 53 of the cover, and which, on the other hand, exerts pressure on the flexible shaft 36 (or a member connected to the flexible shaft 36) toward the ring-shaped body.

Instead of the frictional wheel 40 preferably utilized, there can also be provided a toothed wheel on the flexible shaft 36 engaged with a toothing located on the right-angled portion 42 of the ring-shaped body 42 and 43 Other suitable arrangements will also occur to those of ordinary skill in the art.

Of course, the electrical output of the generator 15 can also be connected to the electrical control circuit 5 by means of additional circuitry, so that when the storage battery or batteries 2 and/or 3 are fully charged, the feed of electrical energy from the generator 15 to the storage batteries 2 and/or 3 is interrupted.

Naturally, it is also possible to connect the flexible shaft 36 to the wheel or to a drive member which is in mechanical linkage with and thereby driven by the wheel, rather than with the axle 58 or with a drive member connected to the axle 58.

Of course, it is also possible to eliminate the storage batteries 2 and/or 3 and to supply the electrical consumer 7 directly via the electrical control circuit 5 with the electrical energy produced by the generator 15.

The apparatus described herein can be used both in and on trailer vehicles which do no have their drives and also in trailer vehicles which have their own drive system which may be temporarily out of service (e.g., motorized units being towed). The relay valve 30 can also be designed as a mechanically activated valve.

Of course, it is also possible to provide a relay coupling between the axle or the wheel or between the part of the trailer vehicle connected to the axle or the wheel and the flexible shaft 36.

One feature of the invention resides broadly in an apparatus for the electrical supply of a consumer on a trailer vehicle, characterized by the fact that a generator 15 for the production of electrical energy is located in or on the trailer vehicle 1.

Another feature of the invention resides broadly in a apparatus characterized by the fact that the generator is connected or can be connected by means of an electrical control circuit 5 to a storage battery 2 and/or to the consumer 7.

Another feature of the invention reside broadly in an apparatus characterized by the fact that the consumer is connected or can be connected by means of the electrical control circuit 5 to the storage battery 2, 3.

Yet another feature of the invention resides broadly in an apparatus characterized by the following features: a) the electrical control circuit 5 has a test apparatus to test the charging status of the storage battery 2, 3; b) the electrical control circuit 5 has a circuit portion which interrupts the feed of electrical energy from the generator 15 to the storage battery 2, 3 when the storage battery 2, 3 has reached a specified charge level; c) the electrical control circuit 5 has a circuit portion by means of which the consumer 7 is directly supplied with electrical energy produced by the generator 15 when the storage battery 2, 3 is being charged.

Another feature of the invention resides broadly in an apparatus characterized by the fact that as the means to drive the generator 15, there is a part 24 in mechanical linkage with a drive shaft of the generator 15, which can be flowed past by pressure medium from a pressure medium source 21, whereby the part 24 in mechanical linkage with the drive shaft of the generator 15 is designed so that it produces a rotational movement of the drive shaft of the generator 915.

Yet another feature of the invention resides broadly in an apparatus characterized by the fact that the part 24 in mechanical linkage with the drive shaft of the generator is designed in the manner of a radial turbine.

Yet another feature of the invention resides broadly in an apparatus characterized by the fact that the part 24 in mechanical linkage with the drive shaft of the generator 15 is designed as a circular disc-shaped body 26, which has vane-like protrusions 34 in the manner of blades, which are oriented perpendicularly or at an angle to the plane surface of the disc-shaped body 26.

A further feature of the invention resides broadly in an apparatus characterized by the fact that the pressure medium used to flow past the part 24 in mechanical linkage with the drive shaft of the generator 15 is compressed air from a compressed air reservoir 21 located in or on the trailer vehicle 1.

Yet another feature of the invention resides broadly in an apparatus characterized by the fact that the compressed air reservoir 21 is a component of a brake system located in or on the trailer vehicle 1, which includes brake cylinders and pneumatic lines connecting them to the pressure medium reservoir 21.

Another feature of the invention resides broadly in an apparatus characterized by the fact that connected to the pneumatic reservoir 21 or to a pneumatic line 22 connected to the pneumatic reservoir 21, there is an additional pneumatic line 23, 33, 31, the free end of which extends to the flow region of the part 24 connected to the drive shaft of the generator 15.

A yet further feature of the invention resides broadly in an apparatus characterized by the fact that there is a relay valve 30, by means of which at least the area 29, 33, 31 including the free end of the additional pneumatic line 23, 29, 33, 31 can be blocked off from the pneumatic reservoir 21 or from another pneumatic line 22 which feeds the additional pneumatic line 23, 29, 33, 31 with compressed air.

Another feature of the invention resides broadly in an apparatus characterized by the fact that the relay valve 30 is located in the additional pressure medium line 23, 29, 33, 31.

Yet another feature of the invention resides broadly in an apparatus characterized by the fact that the relay valve 30 is designed as an electromagnetic valve.

A further feature of the invention resides broadly in an apparatus characterized by the fact that the relay valve 30 is designed as a mechanically activated valve.

A yet further feature of the invention resides broadly in an apparatus characterized by the fact that the relay valve 30 is electrically connected to the control circuit 5, whereby the relay valve 30 is placed in the closed position if the control circuit 5 sends a signal to the relay valve 30 indicating the achievement of a specified maximum charging status of the storage battery 2, 3, and the relay valve 30 is placed in the open position if the control circuit 5 sends a signal to the relay valve 30 indicating that the charge of the storage battery 2, 3 is below a specified level.

Another feature of the invention resides broadly in an apparatus characterized by the fact that the generator 15, the storage battery 2, 3 and the control circuit 5 are located in a common housing 6.

Yet another feature of the invention resides broadly in an apparatus characterized by the fact that the means to drive the generator 15 consist of a flexible (elastic) shaft 36, 37, which is torsionally connected on one hand to a drive shaft of the generator 15 and on the other hand to a wheel or to an axle of the trailer vehicle, or to a part which is or can be torsionally connected to the wheel or the axle, such that the drive shaft of the generator 15 can be driven by the wheel or by the axle, or by the part torsionally connected to the wheel or to the axle. Yet another feature of the invention resides broadly in an apparatus characterized by the fact that the flexible shaft 37, 38, on its side facing the wheel or the axle or the part torsionally connected to the wheel or the axle, has a toothed wheel 40, 52, which is engaged with a toothed part torsionally connected to the wheel or the axle, or with a toothing on the wheel or on the axle.

Another feature of the invention resides broadly in an apparatus characterized by the fact that the flexible shaft 37, 38, on its side facing the wheel or the axle or the part torsionally connected to the wheel or the axle, has a frictional wheel which is in mechanical linkage with the wheel or the axle or with the part torsionally connected to the wheel or the axle.

Yet another feature of the invention resides broadly in an an apparatus characterized by the fact that there is a relay coupling between the flexible shaft 36, 37 and the generator 15.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A land vehicle in the form of a wheeled semi-trailer, said land vehicle being adapted for attachment to and movement by a tractor vehicle, said wheeled semi-trailer comprising:
   a vehicle body having wheels provided thereon;
   an energy consuming device provided on said vehicle body, said energy consuming device being a consumer of electrical energy;
   engagement means for engaging said vehicle body to the tractor vehicle;
   electrical energy providing means for providing electrical energy to the energy consuming device, said electrical energy providing means being mounted on said vehicle body; and
   mechanical energy supply means for supplying mechanical energy for powering said electrical energy providing means;
   wherein said mechanical energy supply means comprises at least one of:
   a compressed air supply; and
   flexible drive shaft means for driving said electrical energy providing means, said flexible driven shaft means being driven by at least one of said wheels of said wheeled vehicle body.

2. The land vehicle in the form of a wheeled semi-trailer according to claim 1, wherein:
   said electrical energy providing means comprises at least one of a storage battery and a generator; and
   an electrical control circuit is configured to be switchably connected to said electrical energy providing means for controlling the flow of electrical energy at least said energy consuming device.

3. The land vehicle in the form of a wheeled semi-trailer according to claim 2, wherein said electrical control circuit switchably connects said energy consuming device and said storage battery.

4. The land vehicle in the form of a wheeled semi-trailer according to claim 3, wherein:
said storage battery has a specified charge level;
said electrical control circuit has a test apparatus to test said specified charge level of said storage battery;
said electrical control circuit has a first circuit portion for interrupting the feed of electrical energy from said electrical energy providing means to said storage battery when said storage battery has reached said specified charge level;
said electrical control circuit has a second circuit portion;
said second circuit portion for directly supplying said energy consuming device with electrical energy produced by said electrical energy providing means when said storage battery is being charged.

5. The land vehicle in the form of a wheeled semi-trailer according to claim 2, wherein:
a mechanical drive means is configured to be mechanically linked with said flexible drive shaft means;
said electrical energy providing means is torsionally driven by said mechanical drive means;
wherein said compressed air supply is configured for providing compressed air to flow past said mechanical drive means to produce a rotational movement of said flexible drive shaft means to supply mechanical energy for powering said electrical energy providing means.

6. The land vehicle in the form of a wheeled semi-trailer according to claim 5, wherein said mechanical drive means in mechanical linkage with said flexible drive shaft means is a radial turbine.

7. The land vehicle in the form of a wheeled semi-trailer according to claim 5, wherein:
said mechanical drive means in mechanical linkage with said flexible drive shaft means is a circular disc-shaped body which has vane-like protrusions;
said circular disc-shaper body has a plane surface; and
said vane-like protrusions are oriented at an angle to the plane surface of the disc-shaped body.

8. The land vehicle in the form of a wheeled semi-trailer according to claim 5, wherein said compressed air supply is located on the wheeled semi-trailer.

9. The land vehicle in the form of a wheeled semi-trailer according to claim 8, wherein said compressed air supply is a component of a brake system located on the wheeled semi-trailer, said brake system includes a plurality of brake cylinders and plurality of pneumatic lines connected to said compressed air supply.

10. The land vehicle in the form of a wheeled semi-trailer according to claim 8, wherein:
at least one of said plurality of pneumatic lines is connected to said compressed air supply;
said at least one of said plurality of pneumatic lines has an end;
said end of said at least one of said plurality of said pneumatic lines is immediately adjacent to said mechanical drive means in mechanical linkage with said flexible drive shaft means.

11. The land vehicle in the form of a wheeled semi-trailer according to claim 10, including a valve for controlling the flow of said compressed air, wherein said valve is connected to at least one of said plurality of pneumatic lines, said valve being for blocking flow of said compressed air from said compressed air supply through said at least one of said plurality of pneumatic lines to said electrical energy providing means.

12. The land vehicle in the form of a wheeled semi-trailer according to claim 11, wherein said valve comprises an electromagnetic valve.

13. The land vehicle in the form of a wheeled semi-trailer according to claim 11, wherein said valve comprises a mechanically activated valve.

14. The land vehicle in the form of a wheeled semi-trailer according to claim 11, wherein;
said valve comprises an electrically controlled valve;
said valve is electrically connected to said electrical control circuit;
said storage battery has a specified charge level;
said valve has an open position and a closed position; and wherein:
said valve is configured to be placed in said closed position if the electrical control circuit sends a signal to said valve indicating the achievement of said specified charge level of said storage battery; and
said valve is configured to be placed in said open position if said electrical control circuit sends a signal to said valve indicating that the charge of said storage battery is below said specified charge level.

15. The land vehicle in the form of a wheeled semi-trailer according to claim 2, including a common housing, wherein said electrical energy providing means, said storage battery and said electrical control circuit are located in said common housing.

16. The land vehicle in the form of a wheeled semi-trailer according to claim 1, wherein:
said vehicle body further has axles provided thereon;
said mechanical energy supply means further comprises at least one additional mechanical drive means;
said at least one additional mechanical drive means is torsionally connected to said at least one of said wheels and said axles;
said flexible drive shaft means is driven by said at least one of said wheels, said axles, and said at least one additional mechanical drive means.

17. The land vehicle in the form of a wheeled semi-trailer according to claim 16, wherein said flexible drive shaft means has a toothed wheel engageable with at least one of:
a toothed part torsionally connected to said at least one of said wheels and said axles; and
a toothing on said at least one of said wheels and said axles.

18. The land vehicle in the form of a wheeled semi-trailer according to claim 16, wherein said flexible drive shaft means has a frictional wheel for being in mechanical linkage with said at least one of said wheels and said axles.

19. The land vehicle in the form of a wheeled semi-trailer according to claim 16, wherein:
said flexible drive shaft means has a frictional wheel for being in mechanical linkage with said additional mechanical drive means, said frictional wheel being torsionally connected to said at least one of said wheels and said axles.

20. The land vehicle in the form of a wheeled semi-trailer according to claim 19, including a coupling, wherein said coupling is disposed between said flexible drive shaft means and said electrical energy providing means.

* * * * *